(12) United States Patent
Teixeira Gomes

(10) Patent No.: US 6,910,625 B2
(45) Date of Patent: Jun. 28, 2005

(54) COMMERCIAL SELF-SERVICE EQUIPMENT

(75) Inventor: Adolfo Roberto Teixeira Gomes, São Paulo (BR)

(73) Assignee: Itautec Philco S/A - Grupo Itautec Philco, Manaus/AM (BR)

( * ) Notice: Subject to any disclaimer, the term of this patent is extended or adjusted under 35 U.S.C. 154(b) by 64 days.

(21) Appl. No.: 10/607,333

(22) Filed: Jun. 26, 2003

(65) Prior Publication Data

US 2004/0262379 A1 Dec. 30, 2004

(51) Int. Cl.[7] .............................................. G06F 17/60
(52) U.S. Cl. .......................... 235/379; 902/30; 902/23
(58) Field of Search .......................... 235/379; 902/8–9, 902/10, 12–13, 14, 20–23, 30

(56) References Cited

U.S. PATENT DOCUMENTS 6,505,774 B1 * 1/2003 Fulcher et al. .............. 235/381
6,778,693 B2   8/2004 Jones et al. ................. 382/135

* cited by examiner

*Primary Examiner*—Karl D. Frech
(74) *Attorney, Agent, or Firm*—Steinberg & Raskin, P.C.

(57) ABSTRACT

Commercial self-service equipment (1) gathering several integrated modules that are responsible for a series of specific service functions to the user, namely: CPU (13), hard disk (14), floppy disk drive (15), video monitor (3) or touch screen (3A), PIN keyboard (4), and function keyboards (5), paper note recognizer (17), paper note dispenser (9) (up to 4 types of paper notes), with sealable cassettes and paper note rejection cassette, coin dispenser (10) (up to 4 silos), thermal printer (16) (to print tickets), ticket reading scanner (18), hybrid card reader (11) (for the reading of "smart cards" and magnetic cards), and wireless electronic wallet (19), which can be electronically "charged" with a certain amount, and capable of performing credit or debit transfer transactions.

10 Claims, 4 Drawing Sheets

COMMERCIAL SELF-SERVICE EQUIPMENT

FIELD OF THE INVENTION

This invention relates to equipment in which the user has an interface appropriated to request and obtain certain services by directly interacting with the equipment, without any human interference and which gathers several integrated modules that are responsible for a series of specific service functions to the user.

BACKGROUND OF THE INVENTION

The self-service terminals destined to the automation and decentralization of commercial services oriented to gambling establishments in general are already known in this art and increasingly disseminated.

Today, there are several equipment that assist users in a series of functions, namely, consultations on video, provision of coins and/or paper notes (in withdrawing operations), deposit of coins and/or paper notes (in deposit operations), payment of bills, etc. To do so, this equipment is provided with consult terminals, withdrawing terminals, deposit terminals, paper note recognition devices, and other modules.

However, there is not any equipment in the market that presents many of these modules integrated in a single cabinet, so as to meet all of the functions mentioned above.

Additionally, there is not any equipment in the market that enables the user to perform exchanges between tickets and money, or between cards (such as "smart cards" and magnetic cards) and money.

This way, it is possible to observe that, in spite of the large variety of commercial self-service equipment known to this art that enable the automatic performance of some functions, as described above, none of them is capable of providing the performance of all of those services simultaneously, or even to offer the exchange of cards or tickets for money, and vice-versa. Hence, none of them completely and satisfactorily meets all market needs.

SUMMARY AND OBJECTS OF THE INVENTION

This way, in order to fulfill this market gap, an object of the present invention, commercial self-service equipment, is to gather several modules that are responsible for a series of specific service functions for the user. These modules are: CPU, hard disk, floppy disk drive, video monitor, keyboard, paper note recognizer, paper note dispenser (up to 4 types of paper notes), with sealable cassettes and paper note rejection cassettes, coin dispenser (up to 4 silos), thermal printer (to print tickets), ticket reading scanner, and the hybrid card reader ("smart cards" and magnetic cards).

Additionally, the equipment improved hereby is equipped with a totally innovative module denominated wireless electronic wallet, which consists of an electronic device that can be electronically "charged" with a certain amount, and can perform fund transfer transactions with the equipment, and these transactions can be the credit or debit of funds.

This way, additionally to the video consult functions, dispensing of coins and/or paper notes, deposit of coins and/or paper notes, and payment of bills, the equipment improved hereby also enables the printing of tickets, the exchange of tickets for coins and/or paper notes, and vice-versa, and the exchange of cards for coins and/or paper notes, and vice-versa.

With such characteristics, the equipment innovated hereby can be used in environments such as cruise ships, gambling establishments, casinos, amusement parks, thematic parks, shopping centers, etc.

The self-service equipment herein is presented even more substantially functional and practical than the current known types, presenting a higher number of functions and, consequently, enabling the users to perform a higher number of services in a single equipment.

BRIEF DESCRIPTION OF THE DRAWINGS

For the sake of illustration, drawings of this invention are attached hereto, through which the invention will be better visualized.

DETAILED DESCRIPTION OF THE INVENTION

Figure 1:
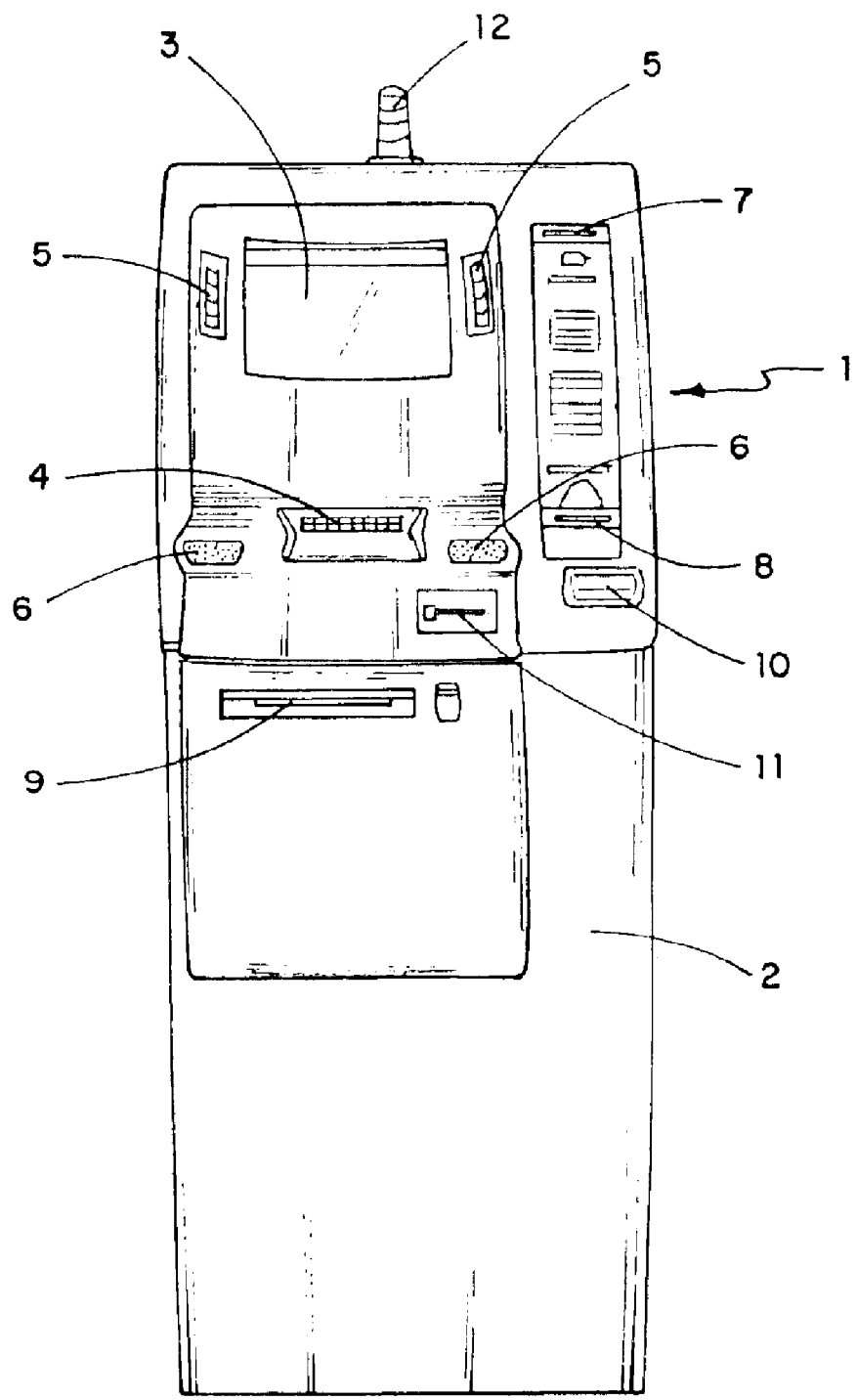
FIG. 1 is a front schematic view of the self-service equipment according to the invention.

The object of this invention patent is a new commercial self-service equipment (1) comprised of a cabinet (2) preferably made of steel plates, and presenting the following components apparent (see FIG. 1):

LCD video monitor (3), preferably with 12", colored, SVGA standard or, optionally, touch screen (3A);
PIN keyboard (4) with 16 keys;
Two function keyboards (5), each one being located on opposite sides of the monitor, and provided with 4 keys each;
Two speakers (6);
Slot (7) for the deposit of paper notes;
Slot (8) for the deposit of tickets;
Paper note dispenser (9) (of up to 4 types of paper notes), with capacity between 2,600 and 2,900 paper notes, with sealable cassettes, and paper note rejection cassette (rejection in stacks and individual rejection of paper notes);
Coin dispenser (10) (with up to 4 silos);
Hybrid card reader (11) (to read "smart cards" and magnetic cards), ABA/ISO standard, with manual insertion; and
Top lamp (12).

Figure 2:
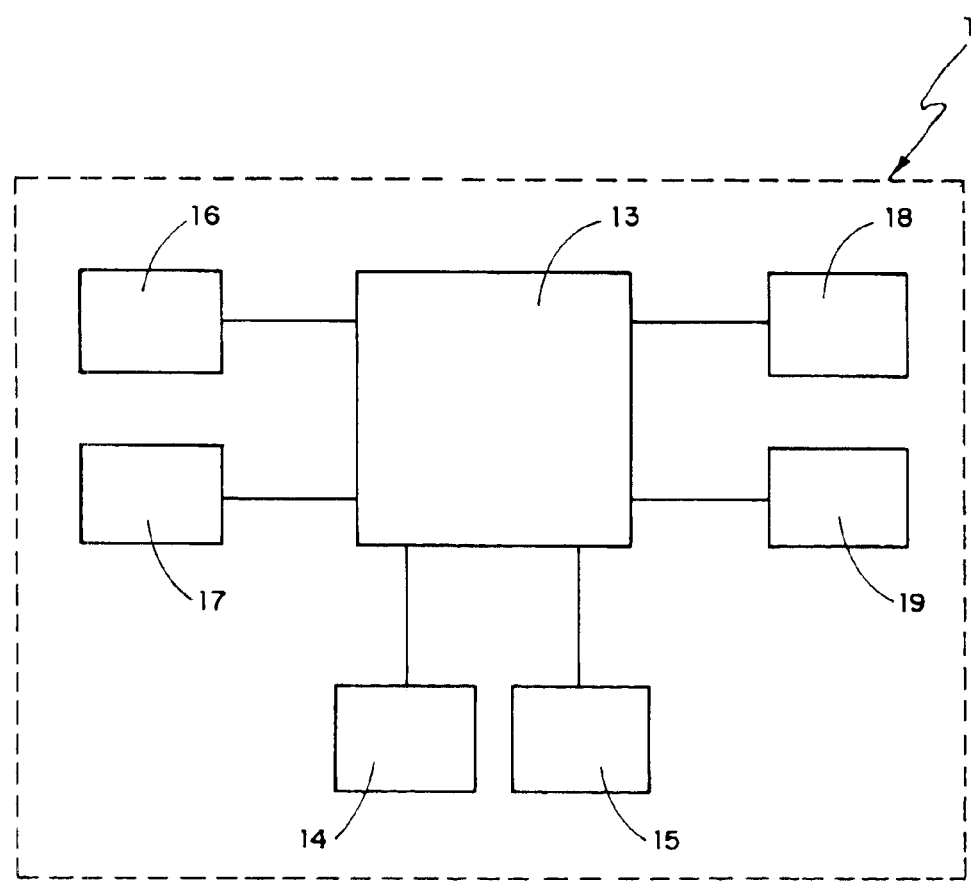
FIG. 2 is a block-diagram of the self-service equipment of FIG. 1, indicating the internal modules comprehended in it.

Inside the cabinet (2), the following modules responsible for a series of specific service functions are provided (see FIG. 2):

CPU (13), preferably Intel Celeron, or superior;
Hard disk (14), minimum of 20.0 GB, or superior;
Floppy disk drive (15), minimum of 1.44 MB, or superior;
Thermal printer (16) (for the printing of tickets);
Paper note recognizer (17), casino standard (JCM);
Scanner (18) for the reading of tickets; and
Wireless electronic wallet (19), which can be electronic charged with a certain amount and perform credit or debit transfer transactions.

Figure 3:
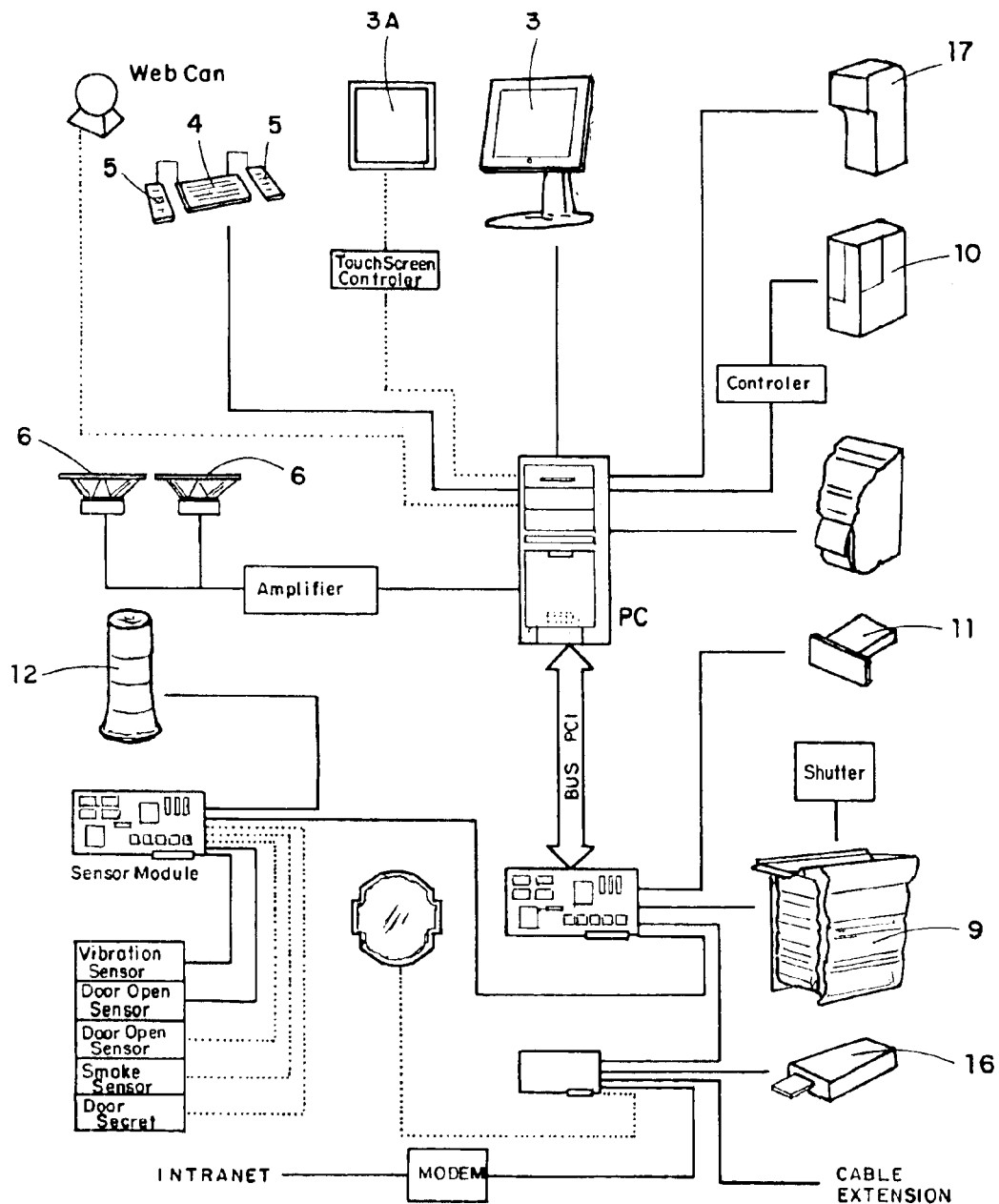
FIG. 3 is a block-diagram of the self-service equipment of FIG. 1, showing the communication of such equipment.
Figure 4:
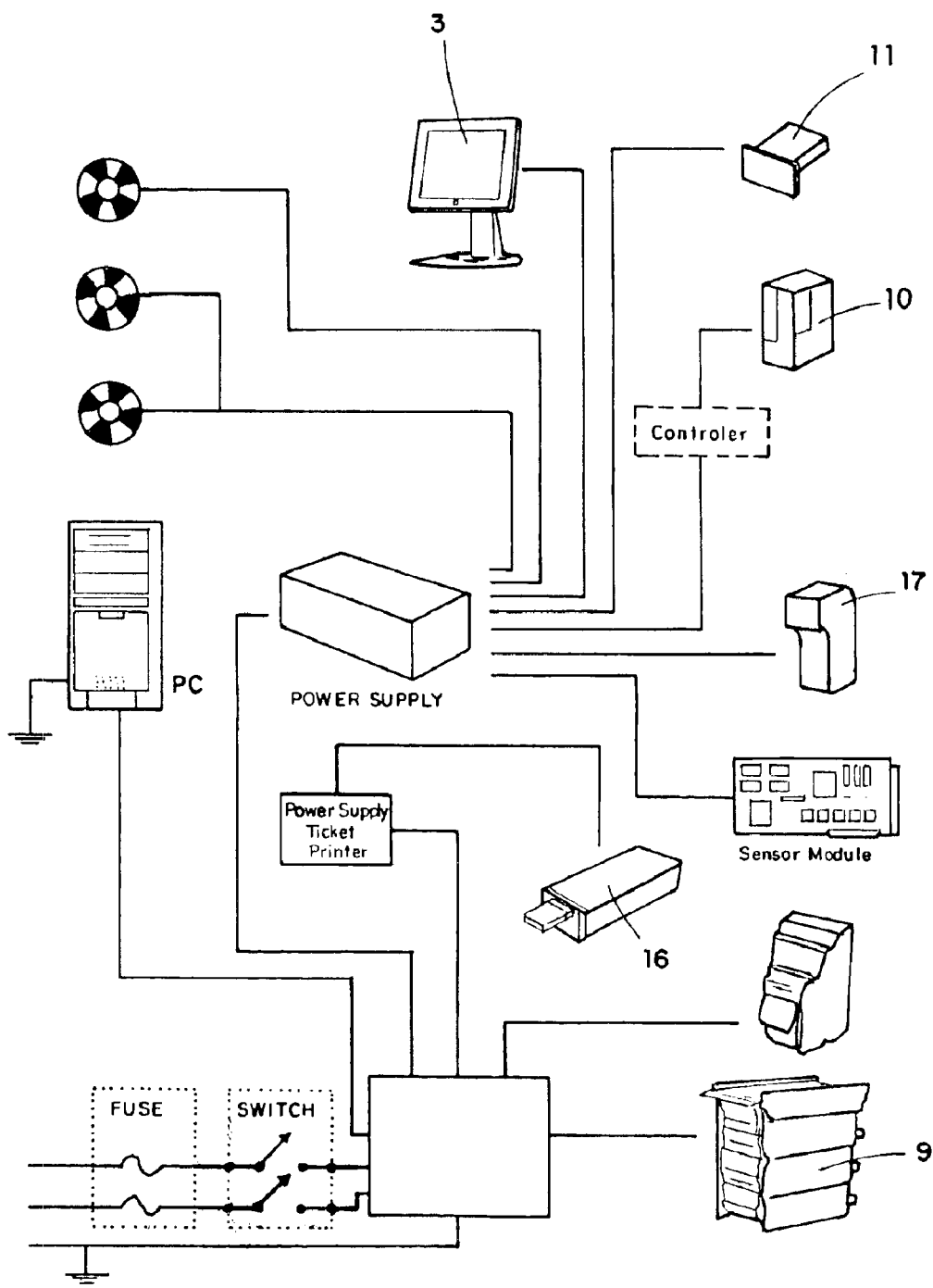
FIG. 4 is a block-diagram of the self-service equipment of FIG. 1, showing the power supply for such equipment.

FIGS. 3 and 4 are block-diagrams of the communication between the several modules comprising the equipment herein, and the power supply for such equipment, respectively.

The functions of the paper note dispenser (9) are:
feeding of documents;
qualification of documents;
simple rejection;
stacking of documents in piles for delivery;
transportation of the pile to the equipment outlet for the client, or to the rejection cassette.

The basic function of this paper note dispenser (9) is to separate notes, feed the paper note cassette, and present the requested amount of paper notes in piles at the outlet.

During the transport of paper notes to the stacking area, several checks are carried out between them, the qualification of paper notes, including the size and thickness control; when the qualification unit detects an incorrect number of documents (double sheet) or a size error (width), these notes are sent to the simple rejection compartment in the paper note cassette.

The notes correctly counted are positioned in the stacking module. After the counting is finalized, the notes are delivered by the transport unit.

The equipment is capable of collecting the notes positioned for delivery after a preset time, of through an application command. The collected notes are stored in the pile rejection compartment in the rejection cassette. This enables the balancing of the contents of documents in the mechanism, and enables the monitoring of collection. All data regarding feeding, rejection and collection are available to the application in internal recorders in the mechanism.

The operator can insert a cassette in any free-feeding unit. The cassette can also operate with different types of documents (denominations) or several cassettes can work with the same type/size of document.

What is claimed is:

1. A commercial self-service apparatus (1), comprising:

a cabinet (2) made of steel plates, characterized for gathering the following components integrated in it:

LCD video monitor (3), with 12", colored, SVGA standard or, touch screen (3A);

PIN keyboard (4) with 16 keys;

Two function keyboards (5), each one being located on opposite sides of the monitor, and provided with 4 keys each;

Two speakers (6);

Slot (7) for the deposit of paper notes;

Slot (8) for the deposit of tickets;

Paper note dispenser (9) of up to 4 types of paper notes, with capacity between 2,600 and 2,900 paper notes, with sealable cassettes, and paper note rejection cassette;

Coin dispenser (10) with up to 4 silos;

Hybrid card reader (11) for reading "smart cards" and magnetic cards, ABA/ISO standard, with manual insertion; and Top lamp (12);

inside the cabinet (2), the following modules are provided:

CPU (13);

Hard disk (14), minimum of 20.0 GB;

Floppy disk drive (15), minimum of 1,44 MB;

Thermal printer (16) for the printing of tickets;

Paper note recognizer (17);

Scanner (18) for the reading of tickets; and

Wireless electronic wallet (19), which can be electronic charged with a certain amount and perform credit or debit transfer transactions.

2. A user interface for a self-service terminal, comprising:

a cabinet including a front panel;

a card reader in said cabinet, said card reader being structured and arranged to receive a user card from a user desiring to carry out a self-service transaction;

a card entry slot in said front panel through which the user desiring to carry out the self-service transaction may insert the user card;

a paper note dispenser in said cabinet for storing the paper notes to be dispensed to a user;

a paper note dispensing slot in said front panel through which the paper note can be dispensed from the paper note dispenser to a user;

a coin dispenser in said cabinet for storing coins to be dispensed to a user;

a coin dispensing slot in said front panel through which coins can be dispensed from the coin dispenser to a user;

a paper note depository in said cabinet for receiving paper notes to be deposited by a user;

a paper note depository slot in said front panel through which paper notes can be deposited by a user;

a ticket voucher depository in said cabinet for receiving the ticket voucher to be deposited by a user;

a ticket voucher depository slot in said front panel through which the ticket voucher can be deposited by a user;

a monitor in said front panel for displaying details of the self-service transaction performed by the user;

a keyboard in said front panel for entering transaction information by the user;

a wireless electronic wallet module disposed inside said cabinet being structured and arranged to electronically charged a monetary amount and perform credit or debit transfer transactions for the user;

a scanner module positioned in said cabinet for the reading of the ticket vouchers; and a paper note recognizer module in said cabinet.

3. The user interface for a self-service terminal according to claim 2, further comprising a lamp being positioned on a top side of said cabinet.

4. The user interface for a self-service terminal according to claim 2, further comprising at least one function keypad in said front panel and being positioned adjacent to said monitor.

5. The user interface for a self-service terminal according to claim 2, wherein said paper note dispenser includes a plurality of sealable cassettes and a paper note rejection cassette.

6. The user interface for a self-service terminal according to claim 2, further comprising at least one speaker in said front panel.

7. The user interface for a self-service terminal according to claim 2, wherein said monitor is an interactive touch-screen monitor.

8. The user interface for a self-service terminal according to claim 2, wherein said cabinet being formed from a plurality of steel plates.

9. The user interface for a self-service terminal according to claim 2, further comprising a thermal printer module in said cabinet for the printing of the ticket vouchers.

10. The user interface for a self-service terminal according to claim 2, further comprising at least one of the following modules in said cabinet a CPU, a hard disk and a floppy disk drive.

* * * * *